United States Patent
Nammi et al.

(10) Patent No.: US 8,514,957 B2
(45) Date of Patent: Aug. 20, 2013

(54) METHOD AND APPARATUS FOR SPECTRALLY EFFICIENT LINK ADAPTATION USING HARQ IN OFDMA SYSTEMS

(75) Inventors: Sairamesh Nammi, Richardson, TX (US); Shankar Venkatraman, Dallas, TX (US); Ashvin Chheda, Plano, TX (US)

(73) Assignee: Apple, Inc., Cupertino, CA (US)

( * ) Notice: Subject to any disclaimer, the term of this patent is extended or adjusted under 35 U.S.C. 154(b) by 344 days.

(21) Appl. No.: 12/935,833

(22) PCT Filed: Apr. 28, 2009

(86) PCT No.: PCT/US2009/041899
§ 371 (c)(1),
(2), (4) Date: Sep. 30, 2010

(87) PCT Pub. No.: WO2009/134747
PCT Pub. Date: Nov. 5, 2009

(65) Prior Publication Data
US 2011/0019768 A1    Jan. 27, 2011

Related U.S. Application Data

(60) Provisional application No. 61/048,369, filed on Apr. 28, 2008.

(51) Int. Cl.
*H04K 1/10* (2006.01)
(52) U.S. Cl.
USPC .................... 375/260; 379/93.08; 714/708
(58) Field of Classification Search
None
See application file for complete search history.

(56) References Cited

U.S. PATENT DOCUMENTS 6,987,738 B2 *  1/2006  Subramanian et al. ........ 370/252
2007/0155337 A1 *  7/2007  Park et al. ........................ 455/69

OTHER PUBLICATIONS

International Search Report and Written Opinion dated Jun. 19, 2009 for International Applicatin No. PCT/CA2009/041899, International Filing Date Apr. 28, 2009 (10-pages).
European Search Report dated May 3, 2011 for European Regional Phase Application No. 09739549.5-2415 based from International Application No. PCT/US2009/041899; International Filing date Apr. 28, 2008 consisting of 5 pages.

(Continued)

*Primary Examiner* — Adolf Dsouza
(74) *Attorney, Agent, or Firm* — Meyertons, Hood, Kivlin, Kowert & Goetzel, P.C.; Eric B. Meyertons (57) ABSTRACT

A method to increase spectral efficiency in a communication system is described herein. The communication system includes at least one mobile station and is capable of transmitting messages encoded according to a plurality of available modulation coding schemes ("MCSs"). Each available MCS includes a modulation scheme and an effective coding rate. The MCSs are indexed according to increasing complexity. A signal-to-interference ratio ("SINR") is determined which is sufficient to satisfy a predetermined frame error rate ("FER"). A first MCS and a corresponding amount of transmissions needed to satisfy the predetermined FER at the SINR using the first MCS are determined. The first MCS has a higher effective coding rate than a second MCS. The second MCS sufficiently satisfies the predetermined FER at the SINR in a single transmission. A message encoded according to the first MCS is transmitted through the communication system using hybrid automatic repeat request ("HARQ").

20 Claims, 6 Drawing Sheets

(56) References Cited

OTHER PUBLICATIONS

Nokia, HARQ with Chase Combining and Incremental Redundancy:, 3GPP Draft; R1-01-0535, 3rd Generation Partnership Project (3GPP), Mobile Competence Centre; 650, Route des Lucioles; F-06921 Sophia-Antipolis Cedex; France, vol. RAN WG1, No. Busan, Korea; 20010528, May 28, 2001; XP050094889 (Retrieved on May 28, 2001).

Motorola, "Effect of Fudge Factors in Computing Capacity of HSDPA", 3GPP Draft; R1-01-0789, 3rd Generation Partnership Project (3GPP), Mobile Competence Centre; 650, Route des Lucioles; F-06921 Sophia-Antipolis Cedex; France, vol. RAN WG1, No. Turin, Italy; 20010825, May 28, 2001; XP050095076 (Retrieved on Aug. 25, 2001).

* cited by examiner

| MCS index | Modulation | R(1st tx) | R(2nd tx) | R(3rd tx) | R(4th tx) | R(5th tx) | R(6th tx) | R(7th tx) | R(8th tx) |
|---|---|---|---|---|---|---|---|---|---|
| 1 | QPSK | 1/12 | 1/12 | 1/12 | 1/12 | 1/12 | 1/12 | 1/12 | 1/12 |
| 2 | QPSK | 1/6 | 1/6 | 1/6 | 1/6 | 1/6 | 1/6 | 1/6 | 1/6 |
| 3 | QPSK | 1/3 | 1/3 | 1/3 | 1/3 | 1/3 | 1/3 | 1/3 | 1/3 |
| 4 | QPSK | 1/2 | 1/3 | 1/3 | 1/3 | 1/3 | 1/3 | 1/3 | 1/3 |
| 5 | QPSK | 2/3 | 1/3 | 1/3 | 1/3 | 1/3 | 1/3 | 1/3 | 1/3 |
| 6 | QPSK | 3/4 | 3/8 | 1/3 | 1/3 | 1/3 | 1/3 | 1/3 | 1/3 |
| 7 | 16 QAM | 3/7 | 1/3 | 1/3 | 1/3 | 1/3 | 1/3 | 1/3 | 1/3 |
| 8 | 16 QAM | 1/2 | 1/3 | 1/3 | 1/3 | 1/3 | 1/3 | 1/3 | 1/3 |
| 9 | 16 QAM | 2/3 | 1/3 | 1/3 | 1/3 | 1/3 | 1/3 | 1/3 | 1/3 |
| 10 | 16 QAM | 3/4 | 3/8 | 1/3 | 1/3 | 1/3 | 1/3 | 1/3 | 1/3 |
| 11 | 16 QAM | 5/6 | 5/12 | 1/3 | 1/3 | 1/3 | 1/3 | 1/3 | 1/3 |
| 12 | 64 QAM | 2/3 | 1/3 | 1/3 | 1/3 | 1/3 | 1/3 | 1/3 | 1/3 |
| 13 | 64 QAM | 3/4 | 3/8 | 1/3 | 1/3 | 1/3 | 1/3 | 1/3 | 1/3 |
| 14 | 64 QAM | 5/6 | 5/12 | 1/3 | 1/3 | 1/3 | 1/3 | 1/3 | 1/3 |

METHOD AND APPARATUS FOR SPECTRALLY EFFICIENT LINK ADAPTATION USING HARQ IN OFDMA SYSTEMS

CROSS-REFERENCE TO RELATED APPLICATIONS

This application is a Submission Under 35 U.S.C. §371 for U.S. National Stage Patent Application of International Application Number: PCT/US2009/041899, filed Apr. 28, 2009 entitled "METHOD AND APPARATUS FOR SPECTRALLY EFFICIENT LINK ADAPTATION USING HARQ IN OFDMA SYSTEMS," which claims priority to U.S. Provisional Application Ser. No. 61/048,369, filed Apr. 28, 2008, the entirety of both which are incorporated herein by reference.

FIELD OF THE INVENTION

The present invention relates generally to communication systems, and more specifically, to a method and system for improving throughput using spectrally efficient link adaptations with hybrid automatic repeat requests ("HARQ") in orthogonal frequency division multiple access ("OFDMA") systems.

BACKGROUND OF THE INVENTION

The demand for reliable and high data throughput wireless communication networks has never been as great as in the present. While initial consumer and business demand was for wireless communication technologies to support voice communication, this demand has grown both in terms of the sheer volume of users as well as the bandwidth requirements; the latter being the result of demand for wireless broadband data services. These services are provided, for example, by Fourth Generation ("4G") wireless systems based on 3GPP Long Term Evolution ("LTE"), IEEE 802.16e WiMax, and 3GPP2 Ultra Mobile Broadband ("UMB"), each of which use orthogonal frequency division multiple access ("OFDMA") technology as the air interface technology.

Considering LTE in particular, the main goals include providing peak data rates up to 100 Mbps in the downlink and up to 50 Mbps in the uplink, reduced latency, significantly improved spectrum efficiency, improved system capacity, coverage, and reasonable system & terminal complexity. In order to achieve these goals, several new radio transmission technologies have been proposed. The LTE downlink uses orthogonal frequency division multiplexing ("OFDM") as an accessing technology, while the LTE uplink uses single carrier frequency division multiple access ("SC-FDMA"). Multiple antennas at the transmitter and receiver increase the data rates as well as achieve diversity gains. By transmitting multiple parallel data streams to single terminal, data rates can be increased significantly. On the other hand, multiple input multiple output ("MIMO") systems are used for increasing the diversity by transmitting the same symbol on different antennas. Furthermore, as in 3G systems, Adaptive Modulation and Coding ("AMC") is used in LTE to exploit channel information.

In practice, link adaptation ("LA") in AMC may fail due to inaccuracies in link estimation and the feedback delays in channel quality measurements. To recover from link adaptation errors, hybrid automatic repeat request ("HARQ") is typically used as a retransmission mechanism. HARQ is used in wireless systems to overcome transmission errors that cannot be corrected using forward error correction ("FEC"). HARQ improves the decoding probability by using information from previous transmissions. Depending on the way the retransmission packets are combined, HARQ systems can be typically classified into two categories namely, Chase combining ("CC") or incremental redundancy ("IR").

In CC, the basic idea is to send a number of repeats of each coded data packet and allowing the decoder to combine multiple received copies of the packet before decoding. The retransmitted packet is an exact replica of the original packet. In this way, the time diversity gain can be realized. This scheme requires less implementation complexity at the receiver.

In IR, instead of sending simple repeats of the entire packet, additional parity information is incrementally transmitted if the decoding fails in the first attempt. Each transmission may or may not be self decodable. If each transmission is self decodable, then it is called partial IR, otherwise full IR.

Link adaptation decisions for a mobile communication device, i.e., mobile station ("MS") or base station ("BS"), are based on a reference signal ("RS") signal to interference ratio ("SINR") estimate. Conventional link adaptation estimates the SINR from the reference signal measurements and determines the highest MCS that can be supported at a pre-determined FER using 1 HARQ transmission.

Link level performance curves show significant signal to noise ratio ("SNR") gains when using HARQ-IR over HARQ-CC due to the transmission of additional parity information in the former. However, conventional LA schemes are unable to take advantage of these HARQ gains. In a multi-user environment, conventional link adaptation does not provide any spectral efficiency gains using HARQ_IR relative to using HARQ-CC.

Therefore, what is needed is a method and apparatus for improving the overall system performance and spectral efficiency of an OFDMA system using link adaptation schemes that can extract gains offered by HARQ.

SUMMARY OF THE INVENTION

The present invention advantageously provides a method, apparatus and system for improving spectral efficiency in an orthogonal frequency division multiplexing ("OFDM") communication system. Generally, embodiments of the present invention map a requested modulation coding scheme ("MCS") to higher order MCS and transmit messages using the higher order MCS in combination with hybrid automatic repeat request with incremental redundancy ("HARQ-IR").

In accordance with one aspect of the present invention, a method is provided for increasing spectral efficiency in a communication system. The communication system includes at least one mobile station and is capable of transmitting messages encoded according to a plurality of available MCSs. Each available MCS includes a modulation scheme and an effective coding rate. The available MCSs are indexed according to increasing complexity. A signal-to-interference ratio ("SINR") sufficient to satisfy a predetermined frame error rate ("FER") is determined. A first MCS and a corresponding amount of transmissions needed to satisfy the predetermined FER using the first MCS are determined. The first MCS has a higher effective coding rate than the second MCS. The second MCS sufficiently satisfies the predetermined FER in a single transmission. A message, encoded according to the first MCS is transmitted through the communication system using HARQ.

In accordance with another aspect of the present invention, an apparatus is provided for increasing spectral efficiency in a communication system. The communication system includes at least one mobile station and is capable of transmitting messages encoded according to a plurality of available MCSs. Each available MCS has a modulation scheme and an effective coding rate. The available MCSs are indexed according to increasing complexity. The apparatus includes an MCS mapper and a transceiver. The MCS mapper is operable to determine a SINR sufficient to satisfy a predetermined FER. The MCS mapper determines a first MCS and a corresponding amount of transmissions sufficient to satisfy the predetermined FER at the SINR using the first MCS. The first MCS has a higher effective coding rate than a second MCS which is sufficient to satisfy the predetermined frame error rate in a single transmission. The transceiver is communicatively coupled to the MCS mapper. The transceiver is operable to transmit a message encoded according to the first MCS through the communication system using HARQ.

In accordance with yet another aspect of the present invention, a communication system includes at least one mobile station and at least one base station. The base station is communicatively coupled to the mobile station. The one base station includes an MCS mapper and a transceiver. The MCS mapper is operable to determine a SINR sufficient to satisfy a predetermined FER. The MCS mapper determines a the MCS and a corresponding amount of transmissions needed to satisfy the predetermined FER using the first MCS. The first MCS has a higher effective coding rate than a second MCS that is sufficient to satisfy the predetermined FER at the SINR in a single transmission. The transceiver is communicatively coupled to the MCS mapper. The transceiver is operable to transmit a message encoded according to the first MCS through the communication system using HARQ.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As an initial matter, while certain embodiments are discussed in the context of wireless networks operating in accordance with the 3rd Generation Partnership Project ("3GPP") evolution, e.g., Long Term Evolution ("LTE") standard, etc., the invention is not limited in this regard and may be applicable to other broadband networks including those operating in accordance with other orthogonal frequency division multiplexing ("OFDM")-based systems including WiMAX (IEEE 802.16) and Ultra-Mobile Broadband ("UMB"), etc. Similarly, the present invention is not limited solely to OFDM-based systems and can be implemented in accordance with other system technologies, e.g., code division multiple access ("CDMA"), single carrier frequency division multiple access ("SC-FDMA"), etc.

Before describing in detail exemplary embodiments that are in accordance with the present invention, it is noted that the embodiments reside primarily in combinations of apparatus components and processing steps related to improving the overall system performance and spectral efficiency of a communication system using link adaptation schemes. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously increases the spectral efficiency of the system by mapping a requested lower level modulation and coding scheme ("MCS") to a higher level MCS and implementing hybrid automatic repeat request ("HARQ") with incremental redundancy ("IR"). Overall system throughput may be increased over twenty percent (20%) by applying the principles of the present invention.

Figure 1:
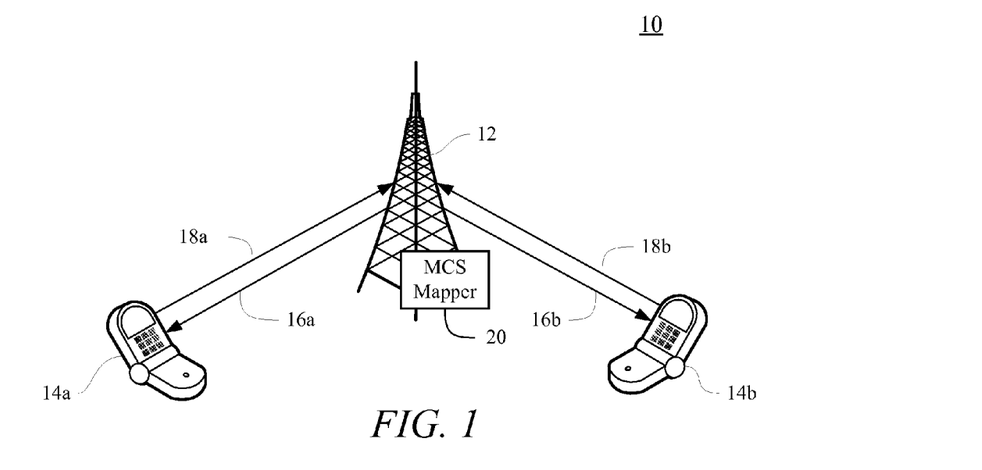
FIG. 1 is a block diagram of an exemplary OFDMA communication system constructed in accordance with the principles of the present invention.

Referring now to the drawing figures in which like reference designators refer to like elements, there is shown in FIG. 1, an exemplary orthogonal frequency division multiplexing ("OFDM") communication system 10 is provided in accordance with the principles of the present invention. Communication system 10 includes at least one base station ("BS") 12 communicating with a plurality of mobile stations ("MS") 14a, 14b (referenced collectively as mobile station 14). Although only one base station 12 and two mobile stations 14 are shown in FIG. 1 for illustrative purposes, it should be noted that communication system 10 may include any number of base stations 12 and mobile stations 14.

According to one embodiment, mobile station 14 may include a wide range of portable electronic devices, including but not limited to mobile phones, personal data assistants ("PDA") and similar devices, which use the various communication technologies such as LTE, advanced mobile phone system ("AMPS"), time division multiple access ("TDMA"), CDMA, global system for mobile communications ("GSM"), general packet radio service ("GPRS"), 1× evolution-data optimized (abbreviated as "EV-DO" or "1×EV-DO") and universal mobile telecommunications system ("UMTS"). The mobile station 14 also includes the hardware and software suitable to support the control plane functions needed to engage in wireless communication with base station 12. Such hardware can include a receiver, transmitter, central processing unit, storage in the form of volatile and nonvolatile memory, and input/output devices, among other hardware.

Base station 12 transmits information to the mobile stations 14 using a downlink channel 16a, 16b (referred to collectively herein as downlink channel 16). In a similar manner, mobile stations 14 transmit information to the base station 12 using an uplink channel 18a, 18b (referred to collectively herein as uplink channel 18). The base station 12 may also include an MCS mapper 20, which determines an alternative MCS for use with HARQ-IR. Available MCSs may include Quadrature Amplitude Modulation (QAM) or Quadrature Phase Shift Key (QPSK) modulation. Operation of the MCS mapper 20 is discussed in greater detail below. Alternatively or additionally, the MCS mapper 20 may reside in mobile station 14.

Figure 2:
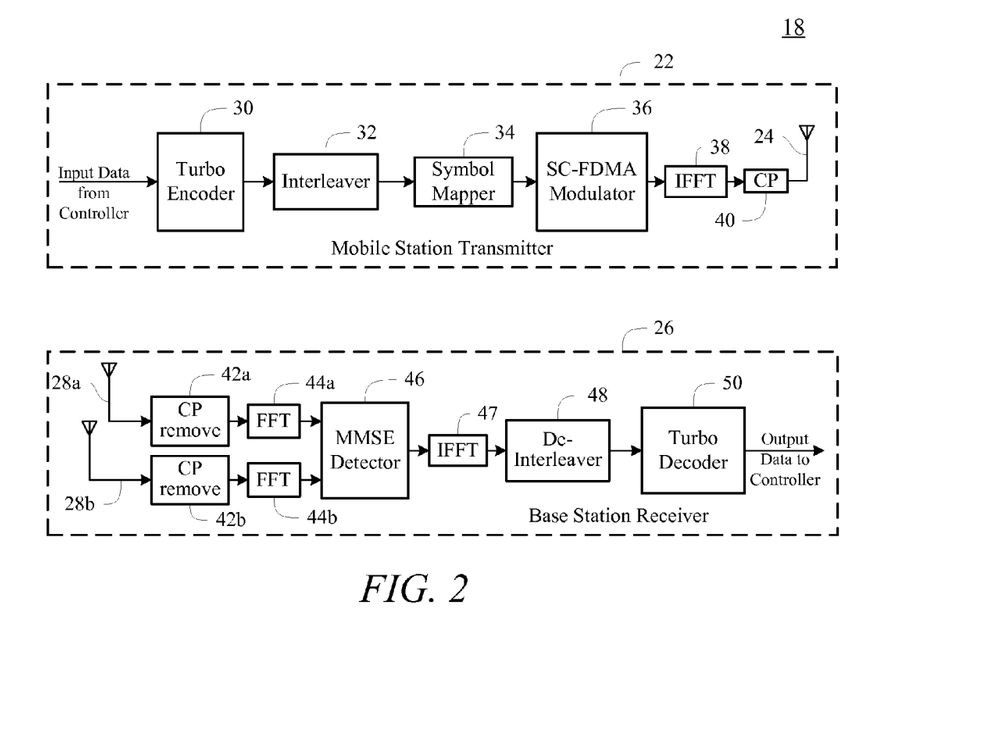
FIG. 2 is a block diagram of an exemplary Long Term Evolution ("LTE") uplink channel constructed in accordance with the principles of the present invention.

Referring now to FIG. 2, a block diagram for an exemplary uplink channel 18 provided. Uplink channel 18 is established by a mobile station 14 having a transmitter 22 with a single transmit antenna 24 and a base station 12 having a receiver 26 that uses two receive antennas 28a, 28b. The transmitter 22 uses a turbo convolutional code ("TCC") encoder 30 to encode data from the controller (not shown) with generator polynomials in octal form. The TCC encoder 30 is followed by a random interleaver 32 and a constellation mapper 34 followed by an SC-FDMA modulator 36 to map coded bits to modulated symbols. The modulated symbols are then transformed from the frequency domain to the time domain by an inverse fast Fourier transform ("IFFT") 38 and a cyclic-prefix ("CP") 40 is added before the resulting SC-FDMA signal is transmitted through the antenna 24.

At the receiver 26 side, the inverse process is followed. Two receive antennas 28a, 28b receive SC-FDMA signals. A CP remover 42a, 42b strips the CP from the signal, which is then converted from the time domain to the frequency domain via a fast Fourier transform 44a, 44b. A minimum mean square error ("MMSE") detector 46 performs frequency domain equalization and is followed by IFFT 47 to recover time domain symbol. This is followed by random de-interleaver 48 and a turbo decoder 50. The de-interleaver 48 is used to compensate for the interleaving operation used at the transmitter 22. Decoded data from the turbo decoder 50 is sent on to the base station 12 controller (not shown) for further processing.

Figure 3:
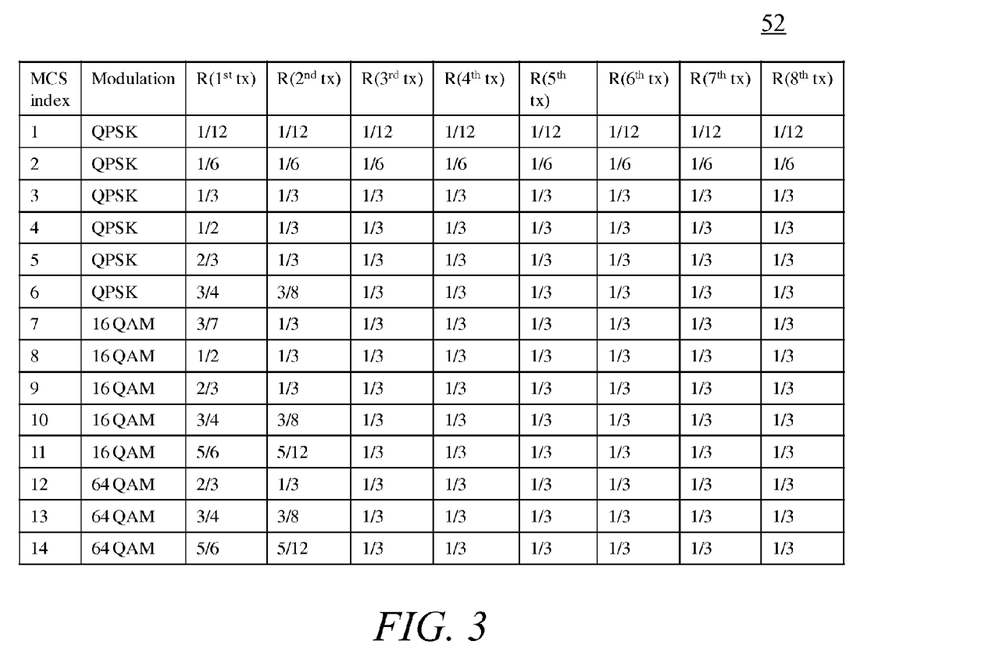
FIG. 3 is a table of modulation and coding schemes considered for hybrid automatic repeat request ("HARQ")

Referring now to FIG. 3, a table 52 is provided showing the modulation coding schemes and effective coding rates per transmission for use with HARQ-IR. The data packets are generated from an R=1/3 turbo code. In table 52, Tx denotes transmission iteration. The parity bits are punctured such that different code rates can be generated. The effective code rate decreases with each transmission for IR, while for CC, the effective code rate remains same in successive retransmissions as there is no new information. For example, MCS index 11 (16 QAM) has an effective code rate of 5/6 on the first transmission which includes very few parity bits. On the second transmission, the effective code rate decreases to 5/12 as some new parity bits are included. By the third transmission, all the remaining parity bits are transmitted and the effective rate is back to 1/3. It should be noted that for IR, once all the parity is transmitted, the process repeats and essentially becomes CC.

Figure 4:
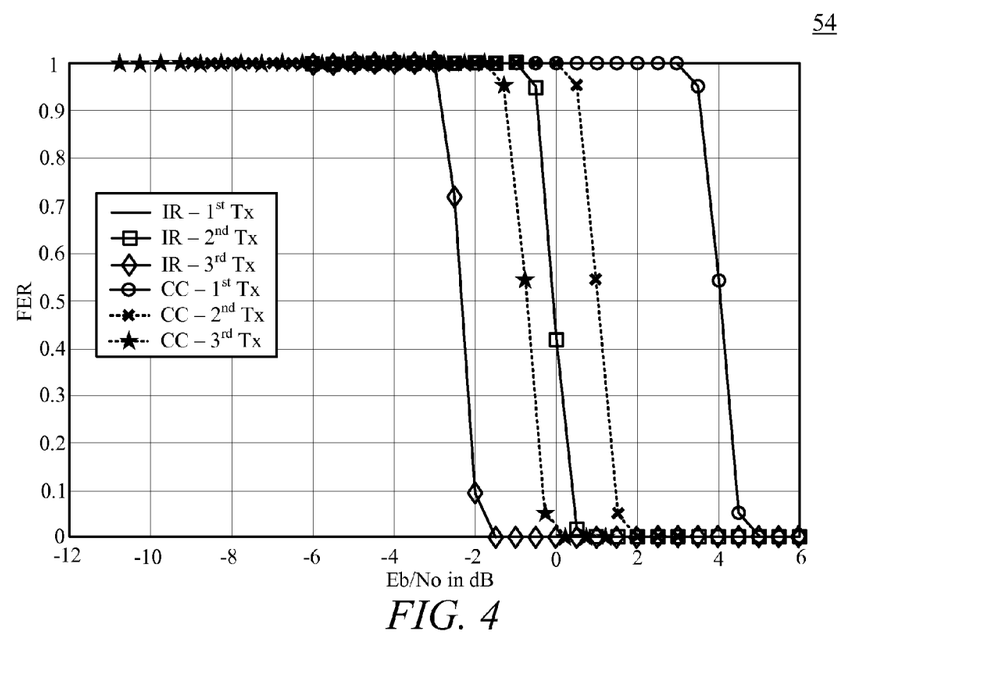
FIG. 4 is a graph illustrating link level performance curves for a system using modulation and coding scheme ("MCS") index 6, QPSK with R=3/4.

FIG. 4 illustrates an exemplary link level curve 54 for an AWGN channel for MCS index 6 (QPSK with R=3/4). As can be seen from link level curve 54, a SINR of approximately 4.5 dB is required to achieve a 10% FER on the first transmission using QPSK with R=3/4. Systems using HARQ can use the same MCS for lower SINR conditions by allowing for subsequent re-transmissions. As shown in FIG. 4, the needed SINR for a 10% FER drops to less than 0.5 dB on the second transmission using HARQ-IR.

Figure 5:
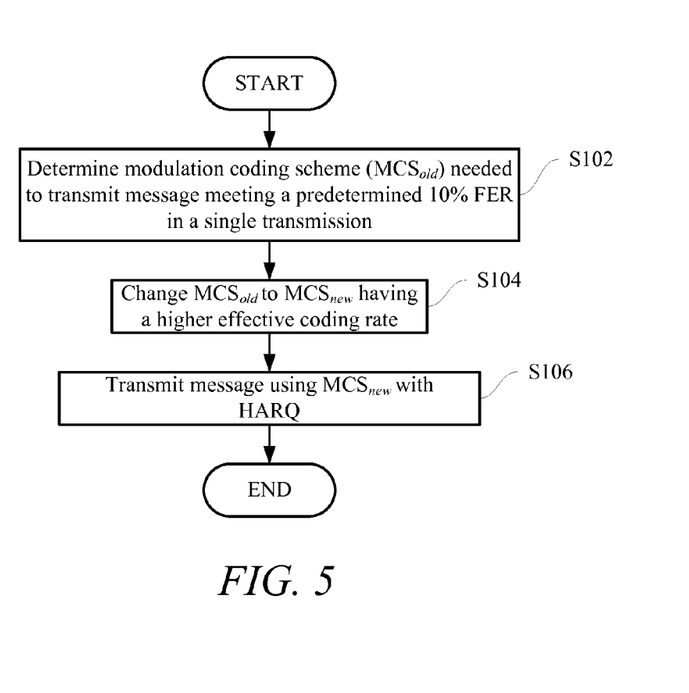
FIG. 5 is a flow chart of an exemplary link adaptation process according to the principles of the present invention.

Referring now to FIG. 5, an exemplary operational flowchart is provided that describes steps to increase the spectral efficiency of link adaptation algorithms that use HARQ-IR. The process begins by determining the modulation coding scheme ($MCS_{old}$) needed to transmit a message meeting a predetermined 10% frame error rate ("FER") in a single transmission (step S102). Generally, the MS measures the SINR of its surrounding environment and requests a certain MCS. The needed MCS is generally determined by comparing the received SINR to a set of predetermined link level curves, such as those provided in FIGS. 4 and 7.

The MCS mapper 20 changes the requested MCS to a new MCS ($MCS_{new}$) having a higher coding rate (step S104) and the message is transmitted using $MCS_{new}$ and HARQ-IR (step S106). Embodiments of the present invention may use one of three methods to determine $MCS_{new}$, as described in detail below.

One embodiment of the present invention uses a selective aggressive mapping ("SAM") mechanism to map the requested MCS to the highest coding rate available for the selected modulation scheme. In other words, for the modulation coding schemes of table 52 (See FIG. 3), MCS index 3 (QPSK with R=1/3) maps to MCS index 6, MCS index 7 (16-QAM with R=3/7) maps to MCS index 11 (16-QAM with R=5/6), and so on. Table 1 shows the MCS mappings resulting from SAM for table 52 from FIG. 3. An exception to the general rule is made for MCS indices 1 and 2 to protect against any errors occurring as a result of the rate increase as mobile devices requesting these MCS schemes are already experiencing poor SINR conditions.

TABLE 1

| | Old MCS | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| New MCS | 1 | 2 | 6 | 6 | 6 | 6 | 11 | 11 | 11 | 11 | 11 | 14 | 14 | 14 |

Figure 6:
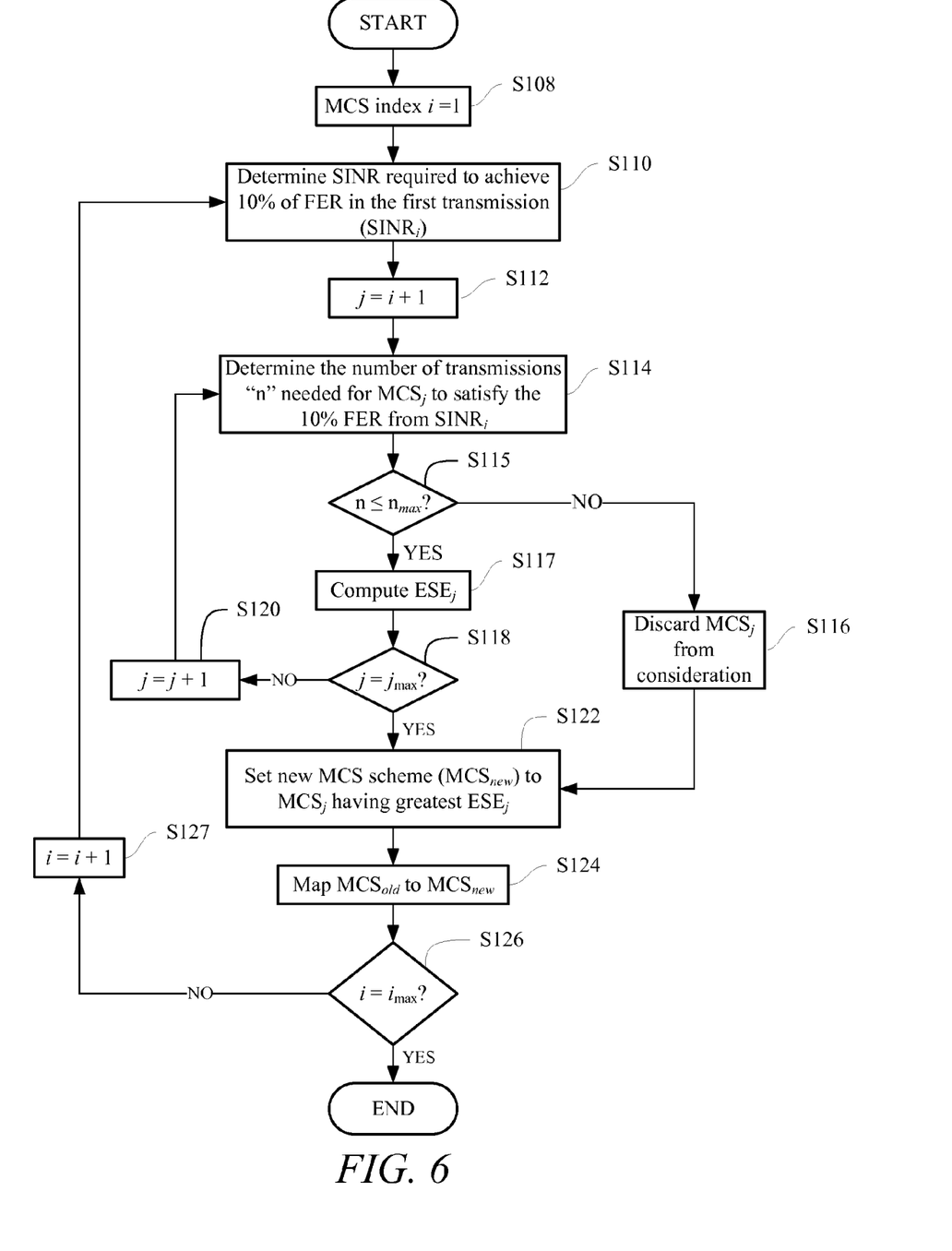
FIG. 6 is a flowchart of an exemplary static maximum effective spectral efficiency mapping ("MESEM-S") process according to the principles of the present invention.

Referring now to FIG. 6, an exemplary operational flowchart is provided that describes steps to increase the spectral efficiency of link adaptation algorithms that use HARQ-IR using a static maximum effective spectral efficiency mapping ("MESEM-S"). For the following process, "i" denotes the MCS index as table 52 (See FIG. 3). The process begins with the first MCS listed in table 52, i.e., i=1 (step S108). Using the link level curves for $MCS_i$, the SINR required to achieve a 10% FER in the first transmission is determined (step S110). Generally, the MS requests a certain MCS level and the BS "reverse engineers" the required SINR (denoted as $SINR_i$) from the link level curves. A second index, denoted as "j", is used to compare higher MCS schemes ($MCS_j$). Beginning at one level higher than $MCS_i$, i.e., j=i+1 (step S112), the number of transmissions "n" needed by $MCS_j$ to achieve the same FER as obtained by $MCS_i$ (step S114). If the desired FER level cannot be reached within a predetermined maximum number of retransmissions, $n_{max}$ (step S115), then the current $MCS_j$ is not a suitable candidate for further consideration and is discarded (step S116). In one embodiment, $n_{max}$=6.

Figure 7:
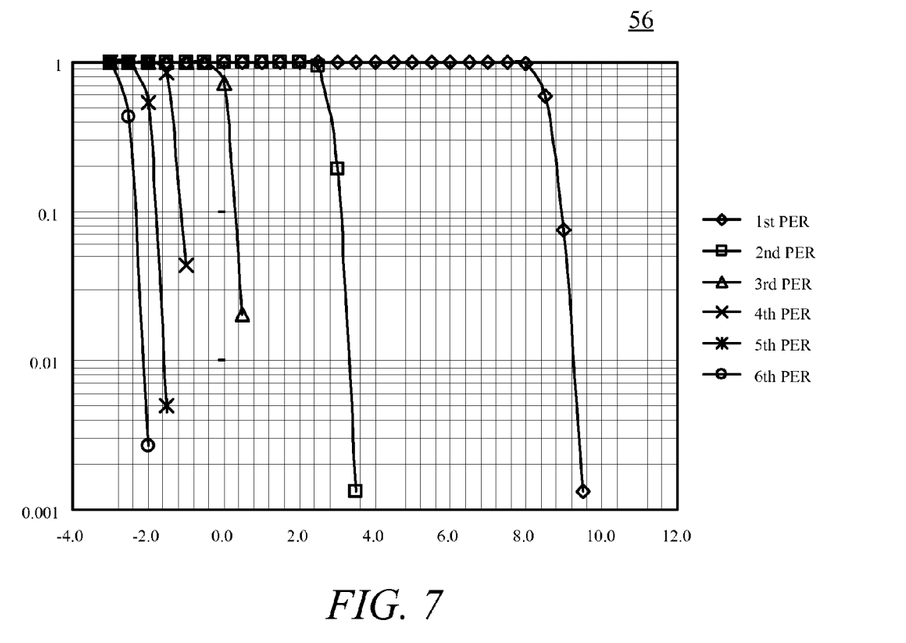
FIG. 7 is a graph illustrating link level performance curves for a system using MCS index 11, 16-QAM with R=5/6.

An exemplary link level graph for MCS index 11, 16-QAM with R=5/6, is provided in FIG. 7. As can be seen by comparing FIG. 4 to FIG. 7, higher coding rates require higher SINR rates to achieve the same FER rate. For example, as shown in FIG. 4, an SINR vale of 4.5 dB is required for a 10% FER on the first transmission using $MCS_6$, but this value is increased to about 9.2 dB using $MCS_{11}$. However, using two transmissions, $MCS_{11}$ needs only about 3.4 dB to achieve the same results.

If the number of transmissions "n" needed by $MCS_j$ to achieve the desired FER rate is less than or equal to $n_{max}$, the MCS mapper 20 calculates an effective spectral efficiency ($ESE_j$) value for $MCS_j$ (step S116) according to the equation:

$$ESE = \frac{\text{code rate} \times \text{modulation factor}}{\text{number of transmission attempts}} \quad (1)$$

where the modulation factor is number of bits per M-ary QAM constellation, e.g., 2 bits for QPSK, 4 bits for 16-QAM and 6 bits for 64-QAM. If an ESE has not been determined for all the higher possible MCS schemes for the link adaptation, i.e. $j \leq j_{max}$ (step S118), then j is incremented (step S120) and an $ESE_j$ is determined for all values of j (steps S114 thru S117).

For example, assuming $MCS_i=5$ (i.e. QPSK with R=2/3), then assuming 2 transmissions are required for $MCS_6$ to achieve a 10% FER, then $$ESE_6 = \frac{2*3/4}{2} = 0.75.$$

Table 2 illustrates all ESE values generated for all values of j>5. In this case, the required SINR=3.5 dB. With MCS 12-14, even 6 transmissions are not sufficient to provide 10% FER at 3.5 dB. So MCS 12, 13 and 14 are not suitable candidates for further ESE comparison.

TABLE 2

| MCS | 6 | 7 | 8 | 9 | 10 | 11 |
|---|---|---|---|---|---|---|
| Retx.ct | 2 | 2 | 3 | 3 | 3 | 4 |
| ESE | 0.75 | 0.858 | 0.666667 | 0.296296 | 1 | 0.833 |

The MCS scheme having the highest $ESE_j$ is selected as the new MCS scheme ($MCS_{new}$) (step S122) and mapped to $MCS_i$ (step S124). As can be seen from Table 2, $MCS_{10}$ has the highest ESE when determining a new MCS for $MCS_5$, thus $MCS_5$ is mapped to $MCS_{10}$.

This process is repeated for each index i value of the link adaptation. In other words, if an $MSC_{new}$ has not been determined for all the MCS schemes for the link adaptation, i.e. $i \leq i_{max}$ (step S126), then i is incremented (step S128) and the process repeated until all the MCS indices are covered. Simulated results using MESEM-S are shown below in Table 3. In Table 3, old MCS corresponds to the MCS with conventional LA scheme and new MCS corresponds to the MSC selected after MESEM-S mapping. It should be kept in mind that in this scheme the table is generated only once and is not altered after that. Hence for practical applications, a pre-determined table is computed and stored based on the turbo interleaver length.

TABLE 3

| | Old MCS | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| New MCS | 1 | 5 | 6 | 10 | 10 | 11 | 10 | 11 | 14 | 14 | 14 | 13 | 14 | 14 |

Figure 8:
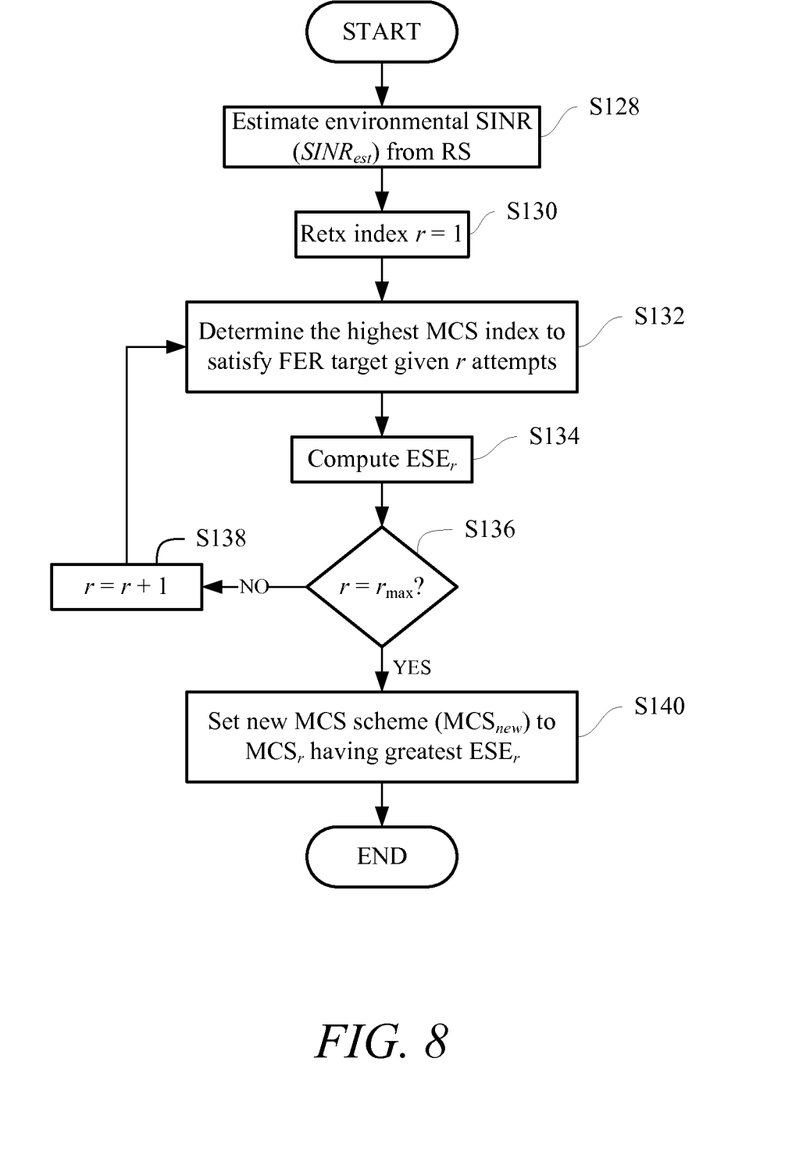
FIG. 8 is a flowchart of an exemplary dynamic maximum effective spectral efficiency mapping ("MESEM-D") process according to the principles of the present invention.

Referring now to FIG. 8, an exemplary operational flowchart is provided that describes steps to increase the spectral efficiency of link adaptation algorithms that use HARQ-IR using a dynamic maximum effective spectral efficiency mapping ("MESEM-D"). In this scheme, the mapping is based on instantaneous received SINR. The environmental $SINR_{est}$ is estimated by the MS or the BS (step S128). The index value indicating the number of intended transmission, denoted as "r", is set equal to 1 (step S130). Using the link level curves, the highest MCS index value $MCS_r$ that can satisfy satisfy the required FER as $SINR_{est}$ is determined (step S132). The MCS mapper 20 calculates a corresponding $ESE_r$ for $MCS_r$ (step S134) according to Eq. (1). If an ESE has not been determined for all additional transmission indices r, i.e. $r < r_{max}$ (step S136), then r is incremented (step S138) and an $ESE_r$ is determined for all values of r (steps S132 and S134). It should be observed that this algorithm determines the MCS that maximizes the ESE based on a search as opposed to a static table mapping. This process may be repeated each time an MS estimates the SINR.

Simulation results, as provided in Table 4, indicate a significant gain in average sector throughput using the embodiments of the present invention, i.e. SAM, MESEM-S and MESEM-D, as compared to conventional link adaptation processes, e.g., Chase and IR. It should be noted that even though link level curves indicate potential gains using IR, there is no gain in sector throughput in using IR as compared to CC with the conventional LA scheme. Using the embodiments of the present invention, it can be seen that huge gains in throughput may be achieved as compared to CC techniques. It can be seen that MESEM-D outperforms all the remaining schemes in average sector throughput as well as FER outage. It should also be noted that MESEM-D provides additional gain as compared to MESEM-S or SAM due to the exhaustive search based on current SINR, while MESEM-S maps the conventional MCS to a more statically spectrally efficient MCS. Even though SAM it not based on environmentally measured values, an almost 18% in throughput may be achieved.

TABLE 4

| HARQ Scheme | Average Sector Throughput (Kbps) | % FER outage | % Gain |
|---|---|---|---|
| Chase-Baseline | 6832 | 0.51 | — |
| IR-Baseline | 6855 | 0.8 | 0.34 |
| MESEM-S | 8233 | 0.8 | 20.36 |
| MESEM-D | 8373 | 0.7 | 22.56 |
| SAM | 8023 | 0.8 | 17.43 |

Figure 9:
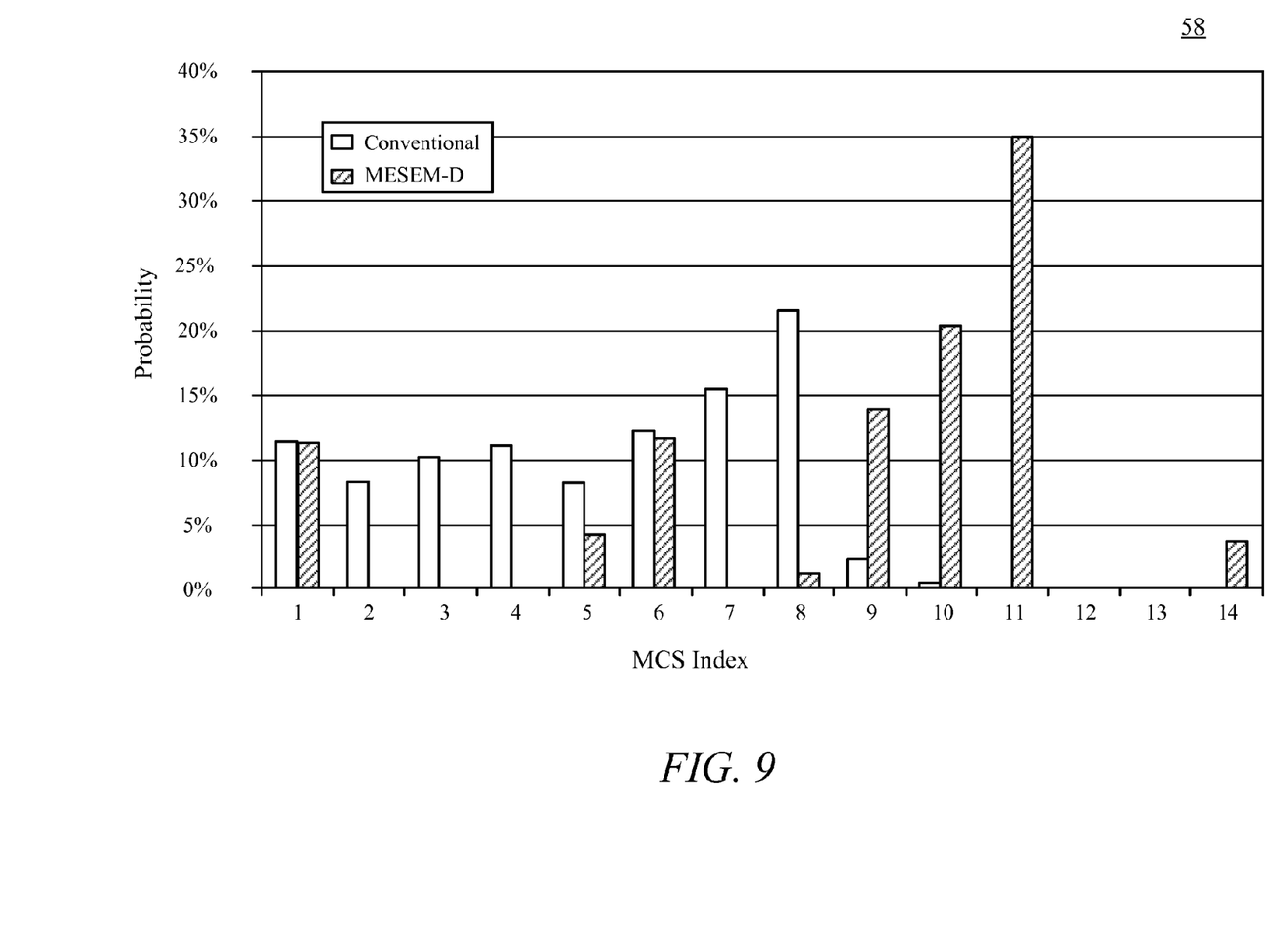
FIG. 9 is a graph illustrating MCS distribution using conventional Chase combining ("CC") compared to dynamic maximum effective spectral efficiency mapping ("MESEM-D") in accordance with the principles of the present invention.

FIG. 9 provides a graph 58 illustrating the MCS distribution for conventional link adaptation and MESEM-D. It can be observed that at the lowest MCS scheme, the distribution is the same for both. However, all the lower MCS schemes for MESEM-D, i.e. index>1, are mapped to the more spectrally efficient MCS schemes. It can be observed that because of this MCS mapping, significant gains in throughput are achieved, as displayed in Table 4.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for increasing spectral efficiency in a communication system, the communication system including at least one mobile station, the communication system capable of transmitting messages encoded according to a plurality of available modulation coding schemes, each modulation coding scheme having a modulation scheme and an effective coding rate, the available modulation coding schemes indexed according to increasing complexity, the effective coding rate being a coding rate of an initial transmission of an incremental redundancy encoded message, the method comprising:
determining a signal-to-interference ratio sufficient to satisfy a predetermined frame error rate received from the mobile station for a single transmission;
determining a first modulation coding scheme and a corresponding amount of transmissions sufficient to satisfy the predetermined frame error rate at the signal-to-interference ratio using the first modulation coding scheme, the first modulation coding scheme having a higher effective coding rate than a second modulation coding scheme, the second modulation coding scheme being sufficient to satisfy the predetermined frame error rate at the signal-to-interference ratio in the single transmission; and
transmitting a message through the communication system using hybrid automatic repeat request, the message encoded according to the first modulation coding scheme.

2. The method of claim 1, wherein the first modulation coding scheme and the corresponding amount of transmissions sufficient to satisfy a predetermined frame error rate is determined according to a set of predetermined link level curves.

3. The method of claim 2, wherein determining the first modulation coding scheme and the corresponding amount of transmissions sufficient to satisfy the predetermined frame error rate at the signal-to-interference ratio using the first modulation coding scheme is performed using one of selective aggressive mapping, static maximum effective spectral efficiency mapping and dynamic maximum effective spectral efficiency mapping.

4. The method of claim 3, wherein determining the first modulation coding scheme and the corresponding amount of transmissions sufficient to satisfy the predetermined frame error rate at the estimated signal-to-interference ratio using the first modulation coding scheme comprises:
creating a mapping table prior to transmitting any message, the mapping table including a first modulation coding scheme for each available modulation coding scheme; and
selecting the first modulation coding scheme corresponding to the second modulation coding scheme from the mapping table.

5. The method of claim 4, further comprising using selective aggressive mapping to create the mapping table, the first modulation coding scheme having a same modulation scheme as the second modulation coding scheme and an effective coding rate being a highest coding rate available for the same modulation coding scheme.

6. The method of claim 4, further comprising using static maximum effective spectral efficiency mapping, wherein creating the mapping table comprises:
receiving a requested modulation coding scheme;
determining a signal to interference ratio needed to achieve a minimum signal to interference ratio of the second modulation coding scheme corresponding to the predetermined frame error rate in a single transmission;
determining the amount of transmissions needed for the first modulation coding scheme to satisfy the predetermined frame error rate;
calculating an effective spectral efficiency for each available modulation coding scheme having a higher index than the second modulation coding scheme; and
mapping the second modulation coding scheme to the modulation coding scheme having a greatest effective spectral efficiency.

7. The method of claim 6, wherein the effective spectral efficiency is equal to the effective coding rate times a modulation factor divided by the amount of transmissions needed for the available modulation coding scheme to satisfy the predetermined frame error rate.

8. The method of claim 6, wherein the signal-to-interference ratio needed to achieve the minimum signal to interference ratio of the second modulation coding scheme corresponding to the predetermined frame error rate in a single transmission and the amount of transmissions needed for the second modulation coding scheme to satisfy the predetermined frame error rate are determined according to a set of predetermined link level curves.

9. The method of claim 3, further comprising using dynamic maximum effective spectral efficiency mapping, wherein determining the first modulation coding scheme and the corresponding amount of transmissions sufficient to satisfy the predetermined frame error rate at the estimated signal-to-interference ratio using the first modulation coding scheme comprises:
determining an estimated signal-to-interference ratio for a mobile station; determining an amount of transmissions needed for each available modulation coding scheme to achieve the estimated signal-to-interference ratio;
calculating an effective spectral efficiency for each available modulation coding scheme; and
selecting the modulation coding scheme having a greatest effective spectral efficiency as the first modulation coding scheme.

10. The method of claim 9, wherein the effective spectral efficiency is equal to the effective coding rate times a modulation factor divided by the amount of transmissions needed for the available modulation coding scheme to satisfy the predetermined frame error rate.

11. The method of claim 9, wherein the amount of transmissions needed for the second modulation coding scheme to satisfy the predetermined frame error rate is determined according to a set of predetermined link level curves.

12. The method of claim 9, wherein mapping the first modulation coding scheme to a second modulation coding scheme is repeated each time an estimated signal to interference ratio is received.

13. An apparatus for increasing spectral efficiency in a communication system, the communication system including at least one mobile station, the communication system capable of transmitting messages encoded according to a plurality of available modulation coding schemes, each available modulation coding scheme having a modulation scheme and an effective coding rate, the available modulation coding schemes indexed according to increasing complexity, the effective coding rate being a coding rate of an initial transmission of an incremental redundancy encoded message, the apparatus comprising:
- a modulation coding scheme mapper operable to:
  - determine a signal-to-interference ratio sufficient to satisfy a predetermined frame error rate received from the mobile station for a single transmission; and
  - determine a first modulation coding scheme and a corresponding amount of transmissions sufficient to satisfy the predetermined frame error rate at the signal-to-interference ratio using the first modulation coding scheme, the first modulation coding scheme having a higher effective coding rate than a second modulation coding scheme, the second modulation coding scheme being sufficient to satisfy the predetermined frame error rate at the signal-to-interference ratio in the single transmission; and
- a transceiver communicatively coupled to the modulation coding scheme mapper, the transceiver operable to transmit a message through the communication system using hybrid automatic repeat request, the message encoded according to the first modulation coding scheme.

14. The apparatus of claim 13, further comprising: a memory including a set of predetermined link level curves, wherein the modulation coding scheme mapper determines the first modulation coding scheme and the corresponding amount of transmissions sufficient to satisfy a predetermined frame error rate using the set of predetermined link level curves.

15. The apparatus of claim 14, wherein the memory further comprises a mapping table, the mapping table created prior to transmitting any message, the mapping table including a first modulation coding scheme for each available modulation coding scheme.

16. The apparatus of claim 14, wherein the transceiver is further operable to receive a requested modulation coding scheme, the modulation coding scheme mapper operates to:
- determine a signal-to-interference ratio needed to achieve a minimum signal-to-interference ratio of the second modulation coding scheme corresponding to the predetermined frame error rate in a single transmission;
- determine the amount of transmissions needed for the first modulation coding scheme to satisfy the predetermined frame error rate; calculate an effective spectral efficiency for each available modulation coding scheme having a higher index than the second modulation coding scheme; and
- map the second modulation coding scheme to the modulation coding scheme having a greatest effective spectral efficiency.

17. The apparatus of claim 16, wherein the effective spectral efficiency is equal to the effective coding rate times a modulation factor divided by the amount of transmissions needed for the available modulation coding scheme to satisfy the predetermined frame error rate.

18. The apparatus of claim 14, wherein the transceiver is further operable to receive an estimated signal-to-interference ratio, the modulation coding scheme mapper operates to:
- determine the amount of transmissions needed for each available modulation coding scheme to achieve the estimated signal to interference ratio;
- calculate an effective spectral efficiency for each available modulation coding scheme; and
- select the modulation coding scheme having a greatest effective spectral efficiency as the first modulation coding scheme.

19. A communication system comprising:
- at least one mobile station; and
- at least one base station communicatively coupled to the at least one mobile station, the at least one base station including a modulation coding scheme mapper operable to:
  - determine a signal-to-interference ratio sufficient to satisfy a predetermined frame error rate received from the mobile station for a single transmission; and
  - determine a first modulation coding scheme and a corresponding amount of transmissions needed to satisfy the predetermined frame error rate using the first modulation coding scheme, the first modulation coding scheme having a higher effective coding rate than the second modulation coding scheme, the second modulation coding scheme being sufficient to satisfy the predetermined frame error rate at the signal-to-interference ratio in the single transmission, the effective coding rate being a coding rate of an initial transmission of an incremental redundancy encoded message; and
- a transceiver communicatively coupled to the modulation coding scheme mapper, the transceiver operable to transmit a message through the communication system using hybrid automatic repeat request, the message encoded according to the first modulation coding scheme.

20. The communication system of claim 19, wherein determining the first modulation coding scheme and the corresponding amount of transmissions sufficient to satisfy the predetermined frame error rate at the estimated signal-to-interference ratio using the first modulation coding scheme is performed using one of selective aggressive mapping, static maximum effective spectral efficiency mapping and dynamic maximum effective spectral efficiency mapping.

* * * * *